United States Patent
Rozema et al.

[11] Patent Number: 5,846,472
[45] Date of Patent: Dec. 8, 1998

[54] MELT DISTRIBUTION ARRANGEMENT FOR THREE LEVEL STACK MOLDS

[75] Inventors: Henry Rozema, Brampton; Vincent Travaglini, Etobicoke; Joseph Robert Klanfar, Rexdale; David Robert Brown, Terra Cotta, all of Canada

[73] Assignee: Tradesco Mold Limited, Rexdale, Canada

[21] Appl. No.: 915,643

[22] Filed: Aug. 21, 1997

[51] Int. Cl.[6] .................................................. B29C 45/32
[52] U.S. Cl. .................................. 264/297.2; 264/328.8; 425/572; 425/588
[58] Field of Search ............................. 264/297.2, 328.8; 425/572, 588

[56] References Cited

U.S. PATENT DOCUMENTS

| | | | |
|---|---|---|---|
| 3,663,145 | 5/1972 | Teraoka | 425/588 |
| 4,539,171 | 9/1985 | Sorensen | 264/328.8 |
| 4,971,747 | 11/1990 | Sorensen | 264/328.8 |
| 5,229,145 | 7/1993 | Brown et al. | 425/563 |
| 5,370,523 | 12/1994 | Kushnir | 425/549 |
| 5,458,843 | 10/1995 | Brown et al. | 264/297.2 |
| 5,464,579 | 11/1995 | Brown et al. | 264/297.2 |

*Primary Examiner*—Jill L. Heitbrink
*Attorney, Agent, or Firm*—Rogers & Milne

[57] ABSTRACT

A method and apparatus for distributing melt through three level stack molds. According to the method a crossover manifold is provided between adjacent mold levels of the stack mold, the crossover manifold having a plenum generally coaxial with a mold axis. Melt is introduced into the plenum through an inlet passage and distributed from the plenum to respective nozzle arrays through a separate outlet conduit associated with each mold level. The apparatus includes a crossover manifold mounted between first and second mold levels and having a plenum generally coaxial with the mold axis. An inlet conduit fluidly communicates with the plenum and an injection head to provide a melt path from the injection head into the plenum. A separate outlet conduit is provided for each mold level. Each outlet conduit fluidly communicates at one end with the plenum and at an opposite end with the injection nozzles of a respective mold level to provide a melt path from the plenum to each of the injection nozzles of the respective mold level. Each outlet conduit defines a respective melt path of generally equal length and resistance to melt flow.

6 Claims, 2 Drawing Sheets

MELT DISTRIBUTION ARRANGEMENT FOR THREE LEVEL STACK MOLDS

FIELD OF THE INVENTION

This invention relates generally to plastic injection molds and more specifically to melt distribution through multi-level stack molds having three levels.

BACKGROUND OF THE INVENTION

Melt distribution through an injection mold is crucial to ensuring that melt arrives at each mold cavity from a common injection head at equal pressures. Failure to provide equal pressure melt to each mold cavity will result in differential filling of the cavities and will not produce consistent parts from cavity to cavity.

The best way to ensure even pressures is to provide equal length melt passages with an identical number of bends of identical radius and arc. Although in theory flow inequalities can be compensated by restrictive orifices in otherwise lower restriction melt passages, in practice this only proves effective if very close limits of melt viscosity can be maintained. Changes in temperature or melt formulation will often require mold disassembly to substitute different orifices.

In two level stack molds, melt is generally provided to a central location in a distribution block by a sprue bar extending from an injection head on a molding machine through the center of a first mold level adjacent the injection head. Equal length melt passages are provided from the central location to each mold cavity.

A problem associated with the use of a sprue bar is that it limits the size of parts that can be molded to parts which can be located between the sprue bar, the outer edges of the mold bases and any guide bars which maintain mold alignment.

In four level stack molds, the sprue bar extends axially through a first pair of stacked molds to a central flow distribution block. Melt flows radially outwardly through the flow distribution block to outer melt passages which are parallel to and radially offset from a central mold axis coaxial with the injector head. The outer melt passages direct melt to radially inwardly extending inner and outer distribution blocks which further direct melt along generally equal length passages to individual mold cores. Each distribution block divides melt flow from a single inlet path to two outlet paths.

The axially located sprue bar in a four level stack mold provides a similar part size restriction as discussed above with respect to two level stack molds.

Another problem associated with four level stack molds is that the maximum height of parts to be molded is limited by the distance that the molding machine can move between its open and closed positions and the amount of space required for each mold level. In some applications, there is enough space for three mold levels, but not a fourth. The prior melt distribution arrangements which distribute melt to inner and outer pairs of mold levels however would not provide equal flow to two mold levels which are "paired" and a third level which is not.

It is an object of the present invention to provide a melt distribution arrangement for a three level stack mold which has generally equal length melt paths for each mold level.

It is a further object of the present invention to provide a melt distribution arrangement for three level stack molds which does not require a sprue bar coaxial with an injection head thereby allowing single parts to be molded which extend across the central mold axis and occupy a substantial portion of the available mold area of each level while further providing generally equal length melt passages to each part.

Other objects and advantages of the present invention will become apparent upon reviewing the detailed description of the invention below.

SUMMARY OF THE INVENTION

A melt distribution arrangement for three level stack molds having mold levels separable in a longitudinal direction generally parallel to a generally centrally disposed mold axis, each said mold level having at least one injection nozzle, said melt distribution arrangement comprising:

a crossover manifold mounted between adjacent of said mold levels and having a plenum generally coaxial with said mold axis;

said crossover manifold having an inlet conduit fluidly communicating with said plenum and an injection head to provide a melt path from said injection head into said plenum at least when said stack mold is closed;

said crossover manifold having a separate outlet conduit serving each of said mold levels, each said outlet conduit fluidly communicating with said plenum and each said injection nozzle of a respective of said mold levels to provide a melt path from said plenum to each said injection nozzle of said respective mold level; and, said outlet conduits defining respective melt paths of generally equal length and resistance to melt flow.

A method of providing melt at substantially equal pressures to each nozzle array of a stack mold having three levels and a nozzle array with at least one injection nozzle associated with each said level, said method comprising the steps of:

i) providing a crossover manifold between adjacent levels of said multi-level stack mold, said crossover manifold having a plenum generally coaxial with a mold axis;

ii) introducing melt into said plenum through an inlet passage; and, iii) distributing melt from said plenum to each said nozzle array through a separate outlet, each said outlet conduit being of similar length and configuration.

DESCRIPTION OF DRAWINGS

Preferred embodiments of the present invention are described below with reference to the accompanying drawings in which.

DESCRIPTION OF PREFERRED EMBODIMENTS

Figure 1:
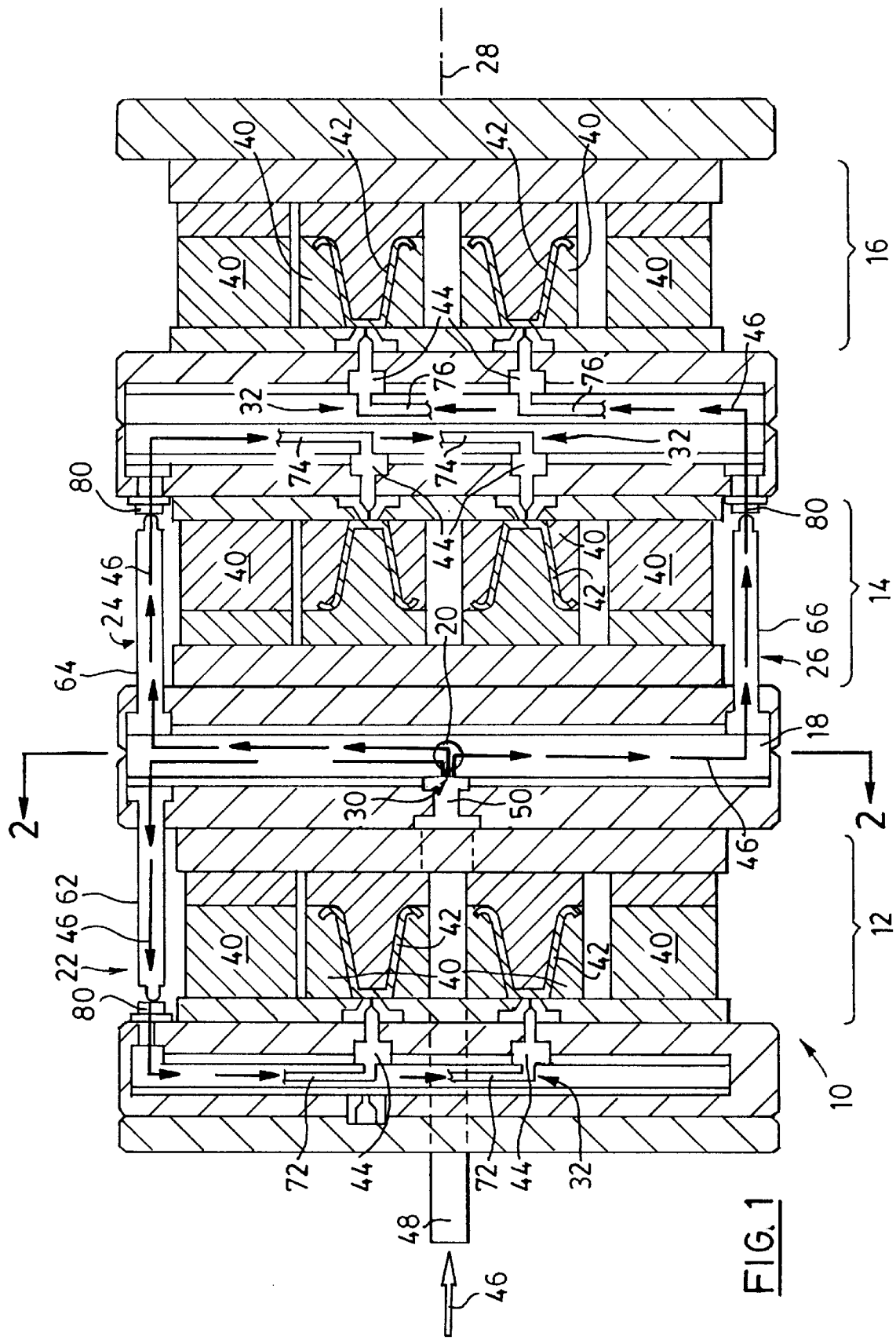
FIG. 1 is a sectional view taken axially along a mold axis of a three level stack mold illustrating a melt distribution arrangement according to the present invention.

A three level stack mold is generally illustrated by reference 10 in FIG. 1. The three level stack mold 10 has a first level 12 to the left as illustrated, a second level 14 in the center and a third level 16 to the right.

A crossover manifold 18 is mounted between the first level 12 and the second level 14. The crossover manifold 18 may be mounted between the second level 14 and third level 16 however this is less desirable as it increases the flow length. The crossover manifold 18 which is shown in more detail in the sectional view of FIG. 2 has a plenum 20 generally coaxial with a mold axis 28 in FIG. 1. The plenum 20 is a chamber which receives melt from a melt inlet conduit 30 and distributes it to first, second and third melt outlet conduits, 22, 24 and 26 respectively. The first, second and third melt outlet conduits 22, 24 and 26 provide melt to respective nozzle arrays 32 associated with the first, second and third mold levels 12, 14 and 16 respectively.

Figure 2:
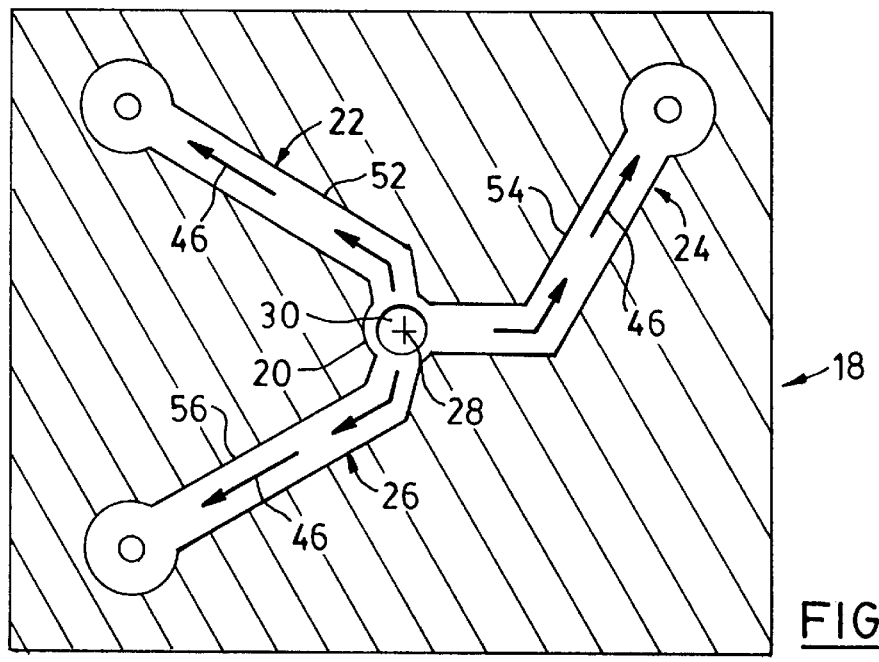
FIG. 2 is a section on line 2—2 of FIG. 1 through a crossover manifold associated with the melt distribution arrangement of FIG. 1.

The three level stack mold illustrated in FIG. 1 is a "multi-cavity" mold in that it has more than one cavity 40 in each level with a part 42 formed in each cavity 40. Only some of the parts 42 are illustrated. Each cavity 40 would typically be fed by a respective injection nozzle 44 associated with that cavity 40.

Melt flow through the stack mold 10 of FIG. 1 is illustrated by arrows 46. Melt is introduced into the plenum 20 by a sprue bar 48 which receives melt from an injection nozzle of an injection head (not shown) associated with a molding machine (not shown) to which the stack mold 10 is mounted. The sprue bar 48 registers with the inlet conduit 30 which in turn fluidly communicates with the plenum 20. The sprue bar 48 would typically be provided with a separable connector 50 at an outer end thereof to allow the second and third mold levels, 14 and 16 respectively to move to the right as illustrated for mold stripping. The separable connector 50 would reconnect upon the stack mold 10 being returned to its closed position as illustrated in FIG. 1.

Each of the outlet conduits 22, 24 and 26 has a first, second and third "run" between the plenum 20 and the respective of nozzles 44 which it serves. The respective first runs 52, 54 and 56 of the outlet conduits 22, 24 and 26 extend through the crossover manifold 18 in a direction generally radial relative to the mold axis 28.

The first runs 52, 54 and 56 register and fluidly communicate with respective second runs 62, 64 and 66. The second runs 62, 64 and 66 in turn register and fluidly communicate with respective third runs 72, 74 and 76. Each of the third runs 72, 74 and 76 fluidly communicates with the nozzles 44 of a respective of the first, second and third mold levels 12, 14 and 16.

The third runs 72, 74 and 76 may comprise a nozzle manifold system which receives melt from a single inlet for each mold level and distributes the melt through a network of runners to each injection nozzle 44 of the nozzle arrays 32. As the nozzles 44 are nearer to the mold axis 28 than are the second runs 62, 64 and 66, and the third runs 72, 74 and 76 lie in a plane generally perpendicular to the mold axis, the third runs 72, 74 and 76 are referred to herein as extending "generally radially" with respect to the mold axis 28 even though their respective center lines may not intersect with the mold axis 28.

In order to allow separation of the first, second and third mold levels, 12, 14 and 16 respectively, each second run 62, 64 and 66 is provided with a separable connector 80 along its length which axially separates as the stack mold 10 is moved toward an open position and reconnects to restore fluid communication as the stack mold 10 is moved toward its closed position as illustrated.

The outlet conduits 22, 24 and 26 are of generally equal length and each outlet conduit contains an equal number of bends of similar angles to yield generally equal resistance to flow along each outlet conduit 22, 24 and 26.

A significant feature of the melt distribution arrangement of the present invention is that it provides a separate melt conduit to each mold level unlike prior arrangements used in four level stack molds in which a melt conduit serves a pair of mold levels. This avoids the flow distribution problem that would otherwise arise in combining a paired set of levels with a third single level.

Figure 3:
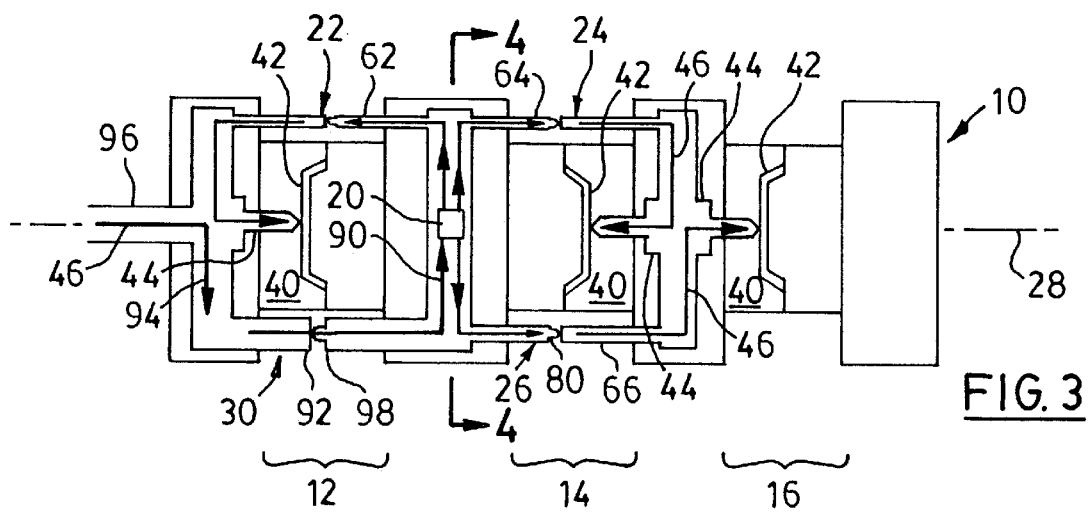
FIG. 3 is a sectional view taken axially along a mold axis of a three level stack mold illustrating an alternate embodiment melt distribution arrangement according to the present invention.
Figure 4:
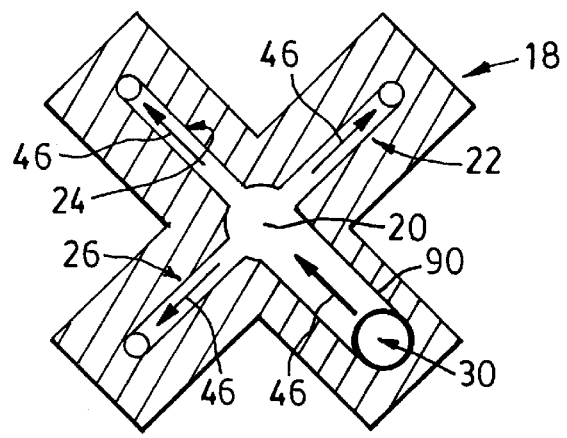
FIG. 4 is a sectional view on line 4—4 of FIG. 3 showing a cross-section through a crossover manifold associated with the alternate distribution arrangement of FIG. 3.

FIGS. 3 and 4 depict an alternate embodiment of the present invention and accordingly like reference numerals are used to indicate similar components. As illustrated in FIGS. 3 and 4, it is not necessary to introduce melt axially into the crossover manifold 18. The inlet conduit of the FIGS. 3 and 4 embodiment includes first, second and third "branches" 94, 92 and 90 respectively, somewhat analogous to the three "runs" of the outlet manifolds 22, 24 and 26 of the FIGS. 1 and 2 embodiment.

The crossover manifold 18 in FIG. 4 includes the third branch 90 of the inlet conduit 30. The third branch 90 extends generally radially relative to the mold axis 28 and fluidly communicates at one end with the plenum 20.

The third branch 90 registers and fluidly communicates at an opposite end with the second branch 92 which extends generally parallel to and radially offset from the mold axis 28. The second branch is located radially outwardly of any parts 42 to be molded. The second branch 92 in turn registers and fluidly communicates with the first branch 94.

The first branch 94 extends generally radially relative to the mold axis to register and fluidly communicate with an injection head 96 of an injection molding machine (not shown) to which the stack mold 10 is mounted. A separable connector 98 is provided in the second branch 92 to enable axial separation and reconnection of the second branch during mold opening and closing cycles respectively.

Preferably, the inlet conduit 30 should have a cross-sectional area of about three times that of any of the outlet conduits for three level molds and about twice that of any of the outlet conduits for two level molds. This will ensure generally equal flow velocities throughout the melt distribution arrangement without undue pressure losses.

The melt distribution arrangement illustrated in FIGS. 3 and 4 is particularly well suited to single cavity molds for molding large parts. It will be appreciated that mold height and width are generally limited by the dimensions of the molding machine. Accordingly, if melt is fed from the injection head 96 using an axially located sprue bar 48, as in the FIGS. 1 and 2 embodiment, the maximum diameter of the part 42 to be molded would have to be less than the span between the sprue bar 48 and the outer perimeter of each mold base. In other words, if the melt inlet conduit 30 must extend along the mold axis 28 through the center of a mold level, then the part 42 cannot span the mold axis 28. As the second branch 92 of the inlet conduit 30 in the FIGS. 3 and 4 embodiment is located radially outwardly of the mold cavities 40, the part 42 can span the mold axis 28 therefore enabling the molding of large single cavity parts 42 using a multi-level stack mold.

Preferably, the separable connectors 50, 80 and 98 will include a drool prevention system such as, for example, the pin-less drool prevention system described in U.S. Pat. No. 5,458,843 which issued on Oct. 17, 1995 to Brown et al.

The above description is intended to be illustrative rather than restrictive. Variations to the exact structures described above may be apparent to appropriately skilled persons without departing from the spirit and scope of the invention as defined by the claims set out below.

We claim:

1. A method of providing melt at substantially equal pressures to each nozzle array of a stack mold having three levels and a nozzle array with at least one injection nozzle associated with each said level, said method comprising the steps of:

i) providing a crossover manifold between adjacent mold levels of said multi-level stack mold, said crossover manifold having a plenum generally coaxial with a mold axis;

ii) introducing melt into said plenum through an inlet conduit; and, iii) distributing melt from said plenum to each said nozzle array through three separate outlet conduits, each of said three outlet conduits serving a different one of said mold levels, each of said three outlet conduits fluidly communicating with said plenum and each said injection nozzle of a respective of said mold levels to provide a melt path from said plenum to each said injection nozzle of said respective mold level, each said outlet conduit being of generally equal length and configuration.

2. A method as claimed in claim 1 wherein:

melt is introduced general axially into said plenum by a sprue bar extending between an injection head of a molding machine and said plenum; and, each said outlet conduit distributes melt through a path extending generally radially outwardly from said plenum relative to said mold axis, across a mold level and radially inwardly towards said nozzle array.

3. A method as claimed in claim 1 wherein:

said inlet conduit extends generally radially outwardly relative to said mold axis from an injection head, across said first mold level radially outwardly of any parts to be molded by said first mold level and radially inwardly relative to said mold axis through said crossover manifold into said plenum; and, each said outlet conduit distributes melt through a path extending generally radially outwardly from said plenum relative to said mold axis, across a mold level and radially inwardly towards a respective nozzle array.

4. A melt distribution arrangement for three level stack molds having mold levels separable in a longitudinal direction generally parallel to a generally centrally disposed mold axis, each said mold level having at least one injection nozzle, said melt distribution arrangement comprising:

a crossover manifold mounted between adjacent of said mold levels and having a plenum generally coaxial with said mold axis;

said crossover manifold having an inlet conduit fluidly communicating with said plenum and an injection head to provide a melt path from said injection head into said plenum at least when said stack mold is closed;

said crossover manifold having three outlet conduits with each of said three outlet conduits serving a different one of said mold levels, each of said three outlet conduits fluidly communicating with said plenum and each said injection nozzle of a respective of said mold levels to provide a melt path from said plenum to each said injection nozzle of said respective mold level; and, each of said three outlet conduits defining a respective melt path of generally equal length and resistance to melt flow.

5. A melt distribution arrangement according to claim 4 wherein:

said inlet conduit registers with a sprue bar which registers with an injection nozzle of an injection molding machine;

each of said three outlet conduits has a first run extending between said plenum and a second run in a direction generally radial to said mold axis, said second run extending generally parallel to and radially offset from said mold axis between said first run and a third run, said third run extending generally radially relative to said mold axis between said second run and said at least one injection nozzle; and, each said second run has a separable connector along its length which disconnects to allow separation of said second run in a direction generally parallel to said mold axis as said mold is moved toward an open position and which reconnects to re-establish fluid communication along said second run upon movement of said mold into a closed position.

6. A melt distribution arrangement as claimed in claim 4 wherein:

said inlet conduit has a first branch extending generally radially with respect to said mold axis from an injection head to a second branch;

said second branch extends generally parallel to and radially offset from said mold axis between said first branch and a third branch;

said third branch extends into said crossover manifold to said plenum in a direction generally radial with respect to said mold axis;

each said outlet conduit has a first run extending generally radially relative to said mold axis from said plenum to a second run; said second run extends generally parallel to and radially offset from said mold axis to a third run; said third run extends generally radially relative to said mold axis between said second run and said at least one injection nozzle; and, each said second run and said second branch has a separable connector along its length which disconnects to allow separation of each said second run and second branch in a direction generally parallel to said mold axis as said mold is moved toward an open position and which reconnects to re-establish fluid communication therealong upon movement of said mold into a closed position.

* * * * *